United States Patent [19]

Hattori et al.

[11] Patent Number: 4,706,075
[45] Date of Patent: Nov. 10, 1987

[54] CIRCUIT ARRANGEMENT AND METHOD FOR MOVING CHARACTERS SUPERIMPOSED ON AN IMAGE REPRESENTED BY A VIDEO SIGNAL

[75] Inventors: Hiroyuki Hattori, Kawasaki; Akiyoshi Morita, Sagamihara, both of Japan

[73] Assignee: Victor Company of Japan, Ltd., Japan

[21] Appl. No.: 629,088

[22] Filed: Jul. 9, 1984

[30] Foreign Application Priority Data

Jul. 8, 1983 [JP] Japan ................................ 58-124123

[51] Int. Cl.$^4$ ............................................... G09G 1/16
[52] U.S. Cl. ..................................... 340/726; 340/749; 340/728
[58] Field of Search ............... 340/726, 724, 814, 748, 340/749, 728

[56] References Cited

U.S. PATENT DOCUMENTS

| | | | |
|---|---|---|---|
| 3,422,420 | 1/1969 | Clark | 340/726 |
| 3,891,792 | 6/1975 | Kimura | 340/726 |
| 4,360,805 | 11/1982 | Andrews et al. | 340/726 |
| 4,437,093 | 3/1984 | Bradley | 340/726 |

*Primary Examiner*—Marshall M. Curtis
*Attorney, Agent, or Firm*—Lowe, Price, LeBlanc, Becker & Shur

[57] ABSTRACT

A composite video signal is processed for superimposing characters on an image represented by the video signal, where a memory (33) and a character generator (31) used for superimposing the characters at an appropriate position are both controlled by a control unit having an odd-field detector (38), a shift pulse generator (44), a rewrite pulse generator (45) and a window pulse generator (54). The odd-field detector (38) produces an odd-field pulse each time a coming odd field is detected, and the number of the odd-field pulses is counted so as to be compared with the number of H sync pulses of the composite video signal. The number of H sync pulses fed to the character generator (31) is reduced by the number of detected odd-field pulses thereby smoothly naturally moving or scrolling displayed characters vertically starting from an odd field. A given number of character lines are displayed simultaneously with remaining lines being concealed by an electronic window (a) formed in response to the window pulse generator (54), and character data is rewritten, by the rewrite pulse generator (45) responsive to the shift pulse generator (44), such that data of character lines pushed out of the window (a) is erased and data of a new line is added.

12 Claims, 13 Drawing Figures

CIRCUIT ARRANGEMENT AND METHOD FOR MOVING CHARACTERS SUPERIMPOSED ON AN IMAGE REPRESENTED BY A VIDEO SIGNAL

BACKGROUND OF THE INVENTION

This invention relates generally to video signal processing involving superimposition of characters on an image, and more particularly, to a circuit arrangement and method for moving the superimposed characters within a picture area.

Recently, character signal generating devices, which superimpose character signals on video signals, are widely used especially in studio-use apparatus of the broadcasting field or the like so that characters are displayed in a superimposed manner on television pictures.

As one example of a use of using such a character signal generating device in combination with other electronic equipment, for instance, when it is intended to superimpose characters on images taken by a television camera so as to display the same, a character signal generating device has hitherto been built in a television camera so as to superimpose characters using such a television camera.

However, in such electronic equipment as the television camera having a conventional character generating device, it is difficult to change the displaying position of characters since there is a drawback that the change in displaying position cannot be smoothly and naturally carried out.

SUMMARY OF THE INVENTION

The present invention has been developed in order to remove the above-described drawbacks inherent to the conventional circuit arrangement for superimposing charcters on an image represented by a video signal.

It is, therefore, an object of the present invention to provide a transmission system for information signals, which is capable of changing smoothly and naturally the displaying position of character signals with easy operation.

According to a feature of the present invention a control unit, which may comprise a microcomputer as will be described hereinlater, is provided for processing a composite video signal for superimposing characters on an image represented by the video signal, where the control unit comprises an odd-field detector, a shift pulse generator, a rewrite pulse generator and a window pulse generator. The odd-field detector produces an odd-field pulse each time a coming odd field is detected, and the number of the odd-field pulses is counted so as to be compared with the number of H sync pulses of the composite video signal. The number of H sync pulses fed to the character generator is reduced by the number of detected odd-field pulses thereby smoothly naturally moving or scrolling displayed characters vertically starting from an odd field. A given number of character lines are displayed simultaneously with remaining lines being concealed by an electronic window formed by way of the window pulse generator, and character data is rewritten, by the rewrite pulse generator responsive to the shift pulse generator, such that data of character lines pushed out of the window is erased and data of a new line is added.

In accordance with the present invention there is provided a circuit arrangement for moving characters superimposed on an image represented by a video signal, for use with a character signal mixing circuit which produces a composite video signal having horizontal and vertical sync pulses, said circuit arrangement comprising: an odd-field detecting means responsive to said composite video signal for detecting odd fields; means responsive to said odd-field detecting means and said horizontal sync pulses for transmitting said horizontal sync pulses, whose number is reduced by the number of detected odd fields, and for producing a return pulse, said horizontal sync pulses being transmitted and said return pulse being produced when a predetermined number of said odd fields are detected; a memory in which character data is stored; a character generator for receiving said character data from said memory so as to supply said mixing circuit with character signals in response to said horizontal sync pulses fed from said means responsive to said odd-field detecting means and to said vertical sync pulses; a rewrite pulse generator responsive to said return pulse for rewriting character data transmitted to said character generator; and a window pulse generator responsive to said horizontal sync pulses and vertical sync pulses for determining displaying width on a picture area of a display unit.

In accordance with the present invention there is also provided a circuit arrangement for moving characters superimposed on an image represented by a video signal, for use with a character signal mixing circuit for producing a composite video signal including horizontal and vertical sync pulses, said circuit arrangement comprising: a memory in which data of character data is stored; a character generator for receiving said character data from said memory so as to supply said mixing circuit with character signals in response to said horizontal sync pulses; computing means responsive to said composite video signal: for detecting odd fields; for transmitting said horizontal sync pulses, whose number has been reduced by the number of detected odd-fields, to said character generator when the number of said horizontal sync pulses equals the number of said detected odd-fields; for producing a return pulse when a predetermined number of said odd-fields are detected; and for rewriting character data transmitted from said memory to said character generator, in response to said return pulse; and a window pulse generator responsive to said horizontal sync pulses and vertical sync pulses for determining displaying width on a picture area of a display unit.

In accordance with the present invention there is further provided a method of vertically moving characters displayed in response to a character signal produced by a character generator in response to data from a memory, such that said characters are superimposed upon an image represented by a composite video signal including horizontal and vertical sync pulses, said method comprising the steps of: detecting whether a coming field is either an odd field or an even field and producing an odd-field pulse each time an odd filed is detected; transmitting said horizontal sync pulses to said character generator for a period of time; reducing said period of time by 1 H every odd field, wherein H is a period of said horizontal sync pulse; detecting whether displayed characters have been shifted by a distance horizontal sync pulses to said character generator for a period of time determined by the number of said odd-fields when said numbers are equal to each other; detecting whether one character line has been shifted on a picture area; producing a return pulse when one character line has been shifted; counting the number of said return pulses; detecting whether the number of said return pulses has reached a predetermined number corresponding to a maximum number of character lines to be displayed; and controlling said memory and said character generator for rewriting data within said character generator such that data of a character line is erased and data of a new line is added, when said number of said return pulses has reached said predetemined number.

BRIEF DESCRIPTION OF THE DRAWINGS

The object and features of the present invention will become more readily apparent from the following detailed description of the preferred embodiments taken in conjunction with the accompanying drawings in which:

FIG. 8, which comprises FIGS. 8A and 8B, is a flowchart for the description of operation of a microcomputer which may be used in place of some circuits of FIGS. 5 and 6.

The same or corresponding elements and parts are designated at like reference numerals throughout the drawings.

DETAILED DESCRIPTION OF THE INVENTION

Figure 1:
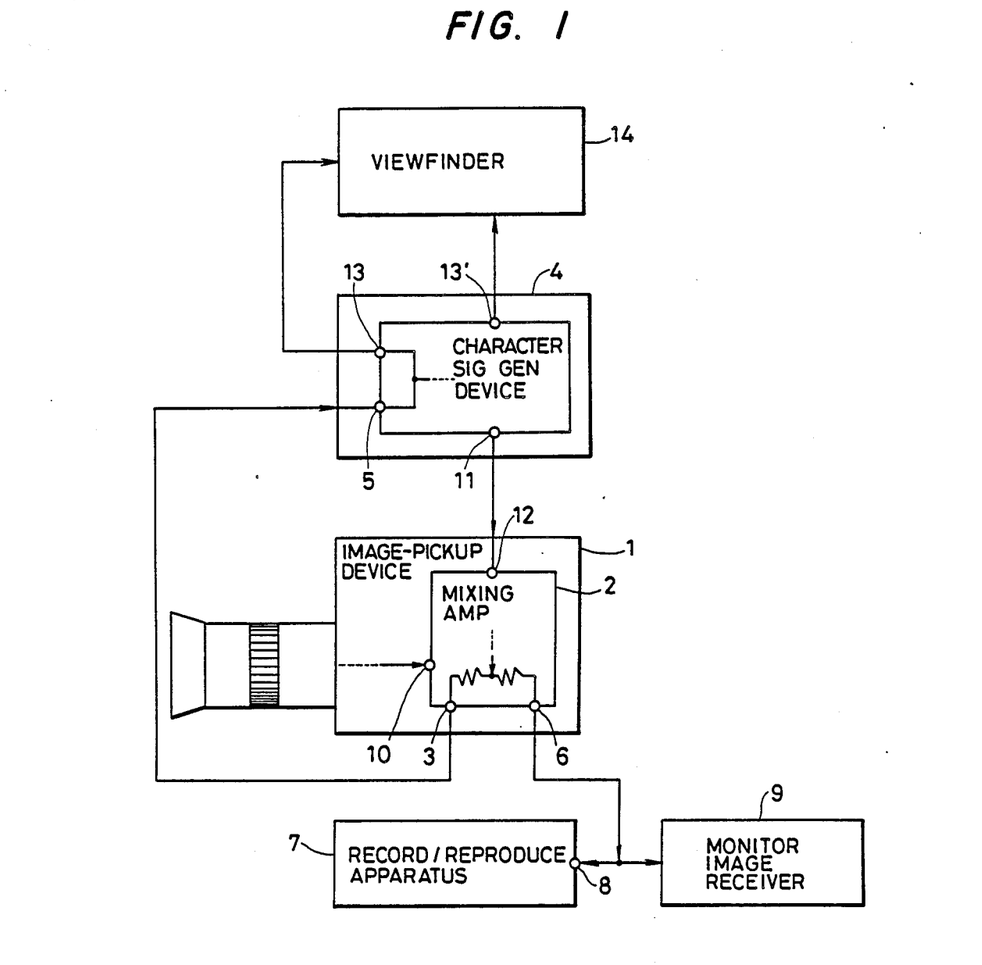
FIG. 1 is a diagram showing a typical video signal recording system using an image-pickup device according to the present invention.

Referring to FIG. 1, a schematic block diagram of a typical video signal recording system, to which the present invention is applied, is shown. In FIG. 1, the reference 1 is an image-pickup device; 2, a mixing amplifier; 3, an output terminal of the mixing amplifier; 4, a character signal generating device; 5, an image-pickup device connecting terminal of the character signal generating device 4; 6, an output terminal of the mixing amplifier 2; 7, a record/reproduce apparatus; 8, an image-pickup device connecting terminal of the record/reproduce apparatus 7; 9, a monitor image receiver; 10, an input terminal of the mixing amplifier 2; 11, an image-pickup device connecting terminal of the character signal generating device 4; 12, an input terminal of the mixing amplifier 2; 13 and 13', viewfinder connecting terminals of the character signal generating device 4; and 14, an electronic viewfinder which will be simply referred to as a viewfinder hereinafter.

The output terminal 3 of the mixing amplifier 2 of the image-pickup device 1 is connected to the image-pickup device connecting terminal 5 of the character signal generating device 4, while the output terminal 6 of the mixing amplifier 2 is connected to the image-pickup device connecting terminal 8 of the record/reproduce apparatus 7, and to the monitor image receiver 9. Furthermore, the input terminal 10 of the mixing amplifier 2 is connected to another circuit (not shown) of the image-pickup device 1. The image-pickup device connecting terminal 11 of the character signal generating device 4 is connected to the input terminal 12 of the mixing amplifier 2, while the viewfinder connecting terminals 13 and 13' of the character signal generating device 4 are connected to the viewfinder 14.

In the typical recording system shown in FIG. 1, when recording a video signal with the image-pickup device 1 being operated, the image taken by the image-pickup device 1 is converted into a video signal which is in turn applied to the mixing amplifier 2 via the input terminal 10 of the mixing amplifier 2, and is then mixed with a composite sync signal within the mixing amplifier 2 so as to be outputted as a composite video signal from the output terminal 3 of the mixing amplifier 2 to be inputted into the character signal generating device 4 in which the sync signal is separated. When the character signal generating device 4 is operated, a character signal, which is synchronized with the sync signal of the composite video signal fed from the mixing amplifier 2, is inputted from the character signal generating device 4 to the mixing amplifier 2 of the image-pickup device 1, and then this character signal, a luminance signal and the composite sync singal are mixed together and amplified within the mixing amplifier 2 so that the character signal is superimposed on the video signal and a portion of a superimposed signal retarded by one horizontal sync period (H) is again fed back to the character signal generating device 4 and another portion of the superimposed signal is fed to the record/reproduce apparatus 4 and to the monitor image receiver 9.

To the viewfinder 14 is fed a video signal upon which the character signal has been superimposed, from the viewfinder connecting terminal 13 of the character signal generating device 4, or the composite video signal is fed from the viewfinder connecting terminal 13 of the character signal generating device 4 while the character signal synchronized with the above-mentioned composite video signal is fed from the viewfinder connecting terminal 13' of the character signal generating device 4.

As a result, when the character signal generating device 4 is operated, a video signal upon which the character signal has been superimposed is recorded in the record/reproduce apparatus 7, while the system is in a state that the image of a subject of present time and characters are superimposed upon each other to be displayed at the viewfinder 14. Furthermore, a similar image is also displayed at the monitor image receiver 9.

Figure 2:
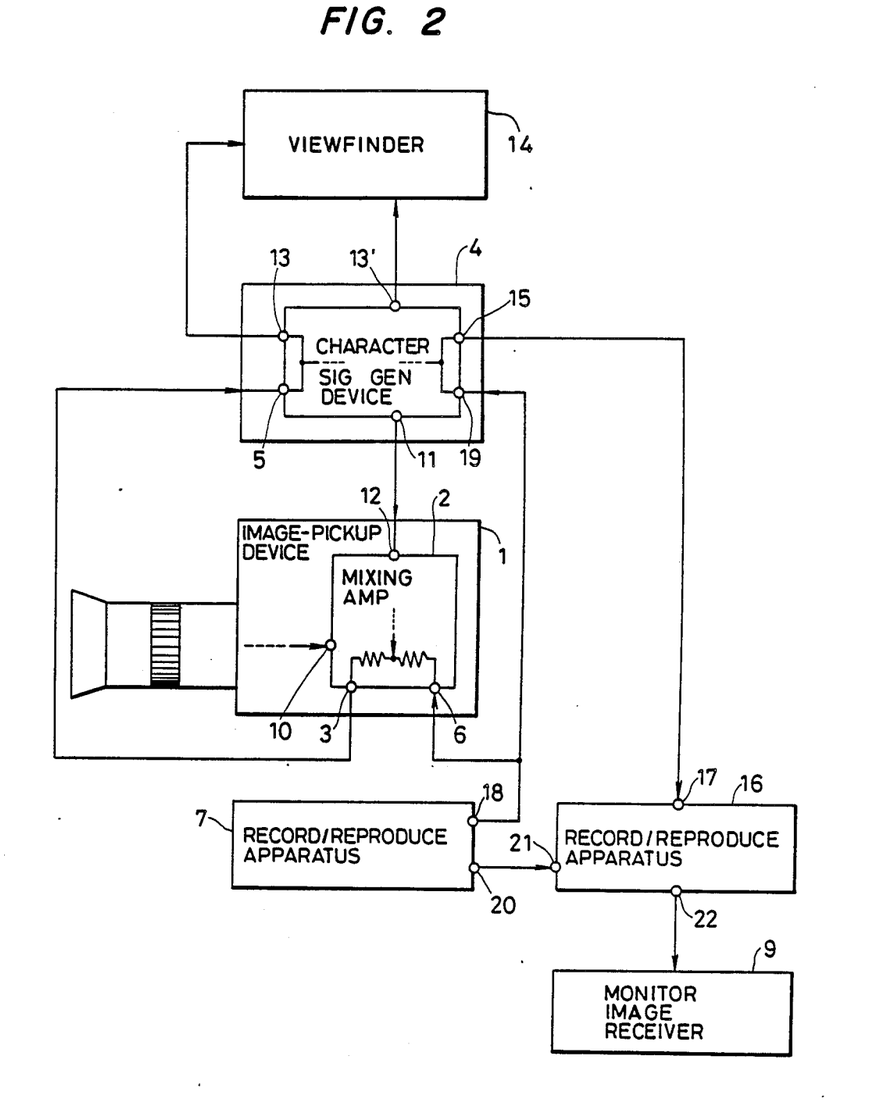
FIG. 2 is a diagram showing typical video signal dubbing system using an image-pickup device according to the present invention.

Now, the dubbing system will be described with reference to FIG. 2. In FIG. 2, elements identical with those in FIG. 1 are designated at the same references, and descrption thereof is omitted. The reference 15 is a video signal output terminal of the character signal generating device 4; 16, a record/reproduce apparatus; 17, a video signal input terminal of the record/reproduce apparatus 16; 18, a video signal output terminal of the record/reproduce apparatus 7; 19, a video signal input terminal of the character signal generating device 4; 20, an audio signal output terminal of the record/reproduce apparatus 7; 21, an audio signal input terminal of the record/reproduce apparatus 16; and 22, a video signal output terminal of the record/reproduce apparatus 16.

The output terminal 3 of the mixing amplifier 2 of the image-pickup device 1 is connected to the image-pickup device connecting terminal 5 of the character signal generating device 4, the input terminal 10 of the mixing amplifier 2 is connected to another circuit (not shown)

of the image-pickup device 1. The image-pickup device connecting terminal 11 of the character signal generating device 4 is connected to the input terminal 12 of the mixing amplifier 2, while the viewfinder connecting terminals 13 and 13' of the character signal generating device 4 are connected to the viewfinder 14, and furthermore, the video signal output terminal 15 of the character signal generating device 4 is connected to the video signal input terminal 17 of the record/reproduce apparatus 16. The video signal output terminal 18 of the record/reproduce apparatus 7 is connected to the output terminal 6 of the mixing amplifier 2, and to the video signal input terminal 19 of the character signal generating device 4, while the audio signal output terminal 20 of the record/reproduce apparatus 7 is connected to the audio signal input terminal 21 of the record/reproduce apparatus 16. Furthermore, the video signal output terminal 22 of the record/reproduce apparatus 16 is connected to the monitor image receiver 9.

In the standard dubbing system shown in FIG. 2, when dubbing (recording through transmission) is effected from the record/reproduce apparatus 7 used for reproducing to the record/reproduce apparatus 16 used for recording, if the record/reproduce apparatus 7 used for reproducing is put in reproduce mode, the video signal outputted from the video signal output terminal 18 of the record/reproduce apparatus 7 used for reproducing is fed to the image-pickup device connecting terminal 5 of the character signal generating device 4 via the output terminals 3 and 6 of the mixing amplifier 2 of the image-pickup device 1, while the audio signal outputted from the audio output terminal 20 of the record/reproduce apparatus 7 used for reproducing is fed to the audio input terminal 21 of the record/reproduce apparatus 16 used for recording.

From the video signal inputted to the character signal generating device 4 is separated a composite sync signal, and is then separated a vertical sync signal. At this time, when the character signal generating device 4 is operated, a character signal synchronized with the sync signal which has been separated within the character signal generating device 4 is outputted from the video signal output terminal 15. In addition, since the video signal output terminal 15 is connectd to the video signal input terminal 19, to which the video signal is inputted from the record/reproduce apparatus 7 used for reproducing, a signal obtained by superimposing the character signal upon the video signal is outputted from the video signal output terminal 15, and this signal is fed to the record/reproduce apparatus 6 used for recording so that the video signal upon which the character signal has been superimposed is fed from the video signal output terminal 22 of the record/reproduce apparatus 16 used for recording to the monitor image receiver 9.

To the viewfinder 14 is fed the video signal from the viewfinder connecting terminal 13 of the character signal generating device 4, and the character signal is fed from the viewfinder connecting terminal 13'.

As a result the video signal, obtained through the superimposition of the character signal upon the reproduced video signal from the record/reproduce apparatus 7 used for reproducing, is recorded in the record/reproduce apparatus 16 used for recording, and the system is such that characters and reproduced images from the record/reproduce apparatus used for reproducing are displayed in superposition at the viewfinder 14. Simultaneously, a similar image is displayed at the monitor image receiver 9.

Figure 3:
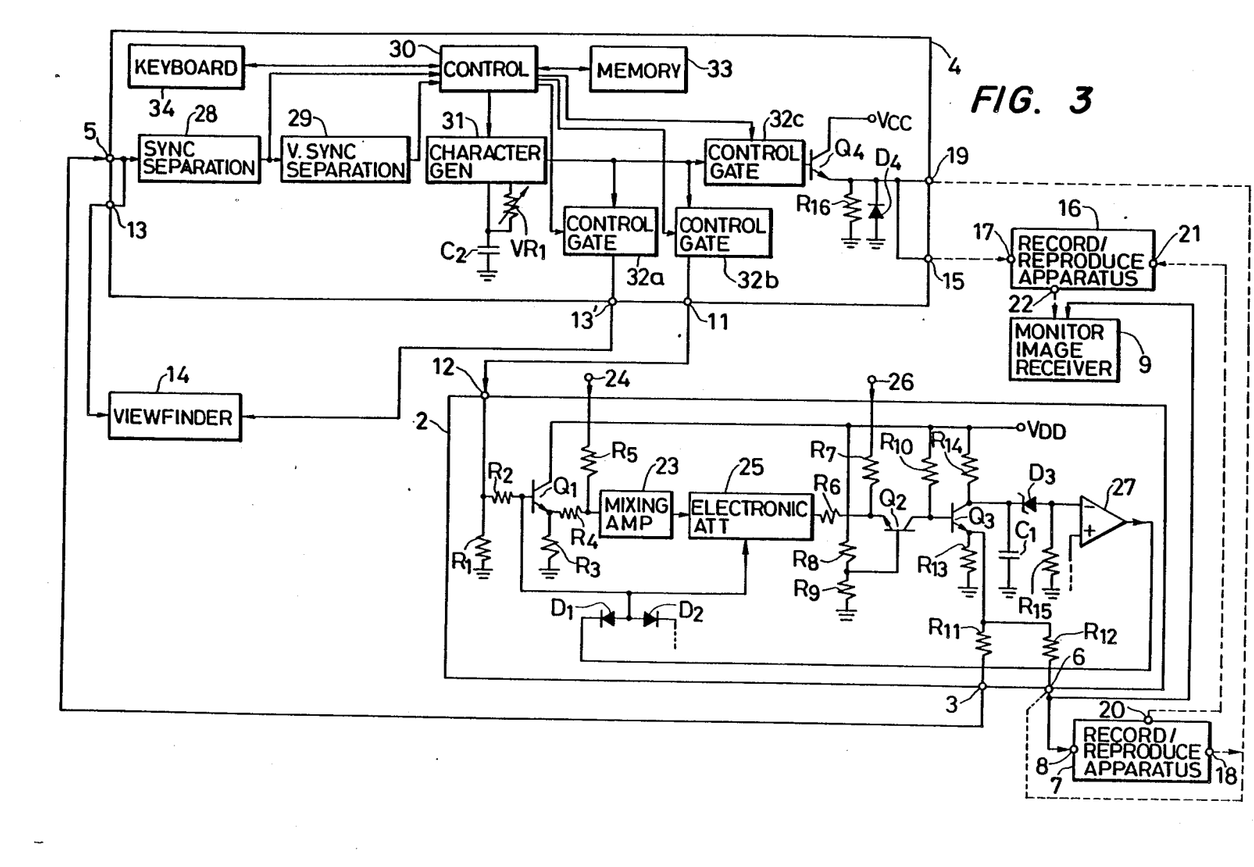
FIG. 3 is a block diagram of the systems shown in FIGS. 1 and 2.

FIG. 3 is a diagram for the description of respective blocks of the mixing amplifier 2, the character signal generating device 4, the record/reproduce apparatus 7, the viewfinder 14 and the record/reproduce apparatus 16 all constituting the typical recording system shown in FIG. 1 and the typical dubbing system shown in FIG. 2.

When it is intended to use the system of FIG. 3 as a recording system, the above-mentioned respective blocks are connected as shown by solid lines, and when it is intended to use the system of FIG. 2 as a dubbing system, the above-mentioned respective blocks are connected as shown by dotted lines.

The system of FIG. 3 will be described hereinafter. Elements identical with those in FIGS. 1 and 2 are designated at like references, and description thereof is omitted.

First of all, the structure of the mixing amplifier 2 will be described. In the block diagram of the mixing amplifier 2 shown in FIG. 3, the reference 23 is a mixing amplifier; 24, a luminance signal input terminal; 25, an electronic attenuator; 26, a composite sync signal input terminal 27, an operational amplifier; $V_{DD}$, a power source terminal Q1 to Q3, transistors; D1 to D2, diodes; D3, a zenner oiode; R1 to R15, resistors; and C1, a capacitor.

The input terminal 12 is grounded via the resistor R1, and is also connected via the resistor R2 to base of the transistor Q1. Collector of the transistor Q1 is connected to the power source terminal $V_{DD}$, while the emitter thereof is grounded via the resistor R3, and is further connected via the resistor R4 to an input terminal of the mixing amplifior 23.

The luminance signal input terminal 23 is connected via the resistor R5 to the input terminal of the mixing amplifier 23. The above-mentioned mixing amplifier 23 is provides for mixing the character signal inputted from the character signal generating device 4 with a luminance signal inputted from the luminance signal input terminal 24, and to amplify the same.

The output terminal of the mixing amplifier 23 is connected to the electronic attenuator 25. A junction between the transistor Q1 and the resistor R2 is connected to the electronic attenuator 25, and to a junction between the anode of the diode D1 and the anode of the diode D2.

The electronic attenuator 25 is connected via the resistor R6 to the emitter of the transistor Q2, while the composite sync signal input terminal 26 is connected via the resistor R7 to the emitter of the transistor Q2. The base of the transistor Q1 is connected via the resistor R8 to the power source terminal $V_{DD}$, and via the resistor to ground. The collector of the transistor Q2 is connected to the base of the transistor Q3, and to the power source terminal $V_{DD}$ via the resistor R10. The emitter of the transistor Q3 is connected via the resistor R11 to the output terminal, and to the output terminal 6 via the resistor R12.

Furthermore, the emitter of the transistor Q3 is grounded via the resistor R13. The collector of the transistor Q3 is connected to the cathode of the zenner diode D3, and to ground via the capacitor C1. Furthermore, the collector of the transistor Q3 is connected via the resistor R14 to the power source terminal $V_{DD}$. In the above, the transistors Q2 and Q3, the resistors R6 to R14, the capacitor C1, and the zenner diode D3 are elements constituting a mixing amplifier which mixes the signal resulted from mixing and amplification within the mixing amplifier 23 with the composite sync signal inputted from the composite signal input terminal 26.

The anode of the zenner diode D3 is connected to an inverting input terminal of the operational amplifier 27, and to ground via the resistor R15. The output terminal of the operational amplifier 27 is connected to the cathode of the diode D1.

Furthermore, the cathode of the diode D2 is connected to an electronice fader circuit (not shown).

Now, the structure of the character signal generating device 4 will be described. In the block of the character signal generating device 4 shown in FIG. 3, the reference 28 is a sync signal separating cirucit; 29, a vertical sync signal separating circuit; 30, a control unit; 31, a character generator; 32a to 32c, control gates; 33, a memory, 34, a keyboard; Vcc a power source terminal; Q4, a transistor; D4, a diode; R16, a resistor; VR1, a variable resistor; and C2, a capacitor.

The image-pickup device connecting terminal 5 is connected to the sync signal separating circuit 28, and to the viewfinder connecting terminal 13. The sync signal separating circuit 28 is connected to the vertical sync signal separating circuit 29, and to the control unit 30. The vertical sync separating circuit 29 is connected to the control unit 30. The character generator 31 is connected via the capacitor C2 to ground, and to a junction between the character generator 31 and the capacitor C2 via the variable resistor VR1. In the above, the capacitor C2 and the variable resistor VR1 are elements constituting a clock circuit which supplies the character generator 31 a clock signal.

The character generator 31 is connected to the control gates 32a, 32b and 32c respectively.

The memory 33 is connected to the control unit 30, which is connected to the character generator 31 and to the control gates 32a, 32b, 32c and to the keyboard 34. The control gate 32a is connected to the viewfinder connecting terminal 13', the control gate 32b being connected to the image-pickup device connecting terminal 11, and the control gate 32c being connected to the base of the transistor Q4. The emitter of the transistor Q4 is connected to the power source terminal Vcc, and the collector thereof is connected to one terminal of the resistor R16 the other terminal of which is grounded, to the cathode of the diode D4 the anode of which is grounded, to the video signal output terminal 15, and to the video signal input terminal 19 respectively.

In the case that the system shown in FIG. 3 is used as a standard recording system, the mixing amplifier 2 the character signal generating device 4, the record/reproduce apparatus 7, and the viewfinder 14 are connected by the solid lines shown in FIG. 3.

Namely, the output terminal 3 of the mixing amplifier 2 is connected to the image-pickup device connecting terminal 5 of the character signal generating device 4, and the output terminal 6 is connected to the image-pickup device connecting terminal 9 of the record/reproduce apparatus 7, and to the monitor image receiver 9.

First of all, the operation of the mixing amplifier 2 will be described. To the mixing amplifier 2 of the image-pickup device 1 is inputted a luminance signal from another circuit (not shown) of the image-pickup device 1 via the luminance signal input terminal 24, and the composite sync signal via the composite sync signal input terminal 26 so as to be mixed within the transistor Q2, and is outputted as a composite video signal from the output terminal 3 via the emitter of the tansistor Q3. This signal is then fed to the sync signal separating circuit 28 of the character signal generating device 4 via the image-pickup device connecting terminal 5 of the character signal generating device 4.

Now, the operation of the character signal generating device will be described. After the composite sync signal is separated from the above-mentioned composite video signal in the sync signal separating circuit 28, it is inputted to the vertical sync signal separating circuit 29 in which a vertical sync signal is separated from the above-mentioned composite sync signal, and this vertical sync signal is fed to the control unit 30. In addition, the composite sync signal separated within the sync signal separating circuit 28 is also fed to the control circuit 30.

The character signal outputted from the character generator 31 is fed via the control gate 32a to the viewfinder connecting terminal 13', and is also fed to the image-pickup device connecting terminal 11 via the control gate 32b so that the character signal from the character generator 31 is fed to base of the transistor Q1 via the image-pickup device connecting terminal 11 and the input terminal 12 of the mixing amplifier 2.

The character signal generating device 4 is capable of selecting one of the following three modes with the command from the keyboard 34.

(1) IMAGE-PRODUCING MODE
(2) IMAGE-OUTPUTTING MODE
(3) MONITORING MODE

The image-producing mode is a mode for producing an image upon which characters are superimposed within the viewfinder 14. Namely, the composite video signal outputted from the output terminal 3 of the mixing amplifier 2 of the image-pickup device 1 is inputted to the image-pickup device connecting terminal 5. The composite video signal inputted thereto is divided into two flows. One of them is fed via the viewfinder connecting terminal 13 to the viewfinder 14.

The other is fed via the sync signal separating circuit 28 and the vertical sync signal separating circuit 29 to the control unit 30. The control portion 30 outputs a control signal to the character generator 31, which control signal data of character signals stored in the memory 33 is transmitted to the character generator 31 in accordance with arbitrary inputted characters defined by the manipulation of the keyboard 34. In receipt of the control signal, the character generator 31 outputs a character signal which is synchronized with the sync signal of the composite video signal inputted to the image-pickup device connecting terminal 5.

Meanwhile, the control unit 30 controls the control gates 32a, 32b and 32c.

In the case of the image-producing mode the state of the control gates are as follows:

control gate 32a . . . ON
control gate 32b . . . OFF
control gate 32c . . . OFF

Accordingly, the character signal, which is the output signal from the character generator 31, is outputted from only the viewfinder connecting terminal 13' via the control gate 32a put in conductive state, so as to be fed to the viewfinder 14, and therefore, an image and characters are displayed in a superimposed manner in the viewfinder 14.

The image-outputting mode is a mode for recording the superimposed signal obtained by superimposing the character signal upon the video signal produced in the image-producing mode, by way of the record/reproduce apparatus 7. The way of flow of signals is the same as in the image-producing mode. However, the following two points are different from the image-producing mode.

(1) Character-inputting from the keyboard 34 cannot be carried out.

(2) The control gates are in the following states:
control gate 32a . . . OFF
control gate 32b . . . ON
control gate 32c . . . ON Accordingly, the character signal synchronized with the sync signal of the composite video signal, which is inputted to the image-pickup device connecting terminal 5 of the character signal generating device, is fed from the character generator 31 via the control gate 32b, the image-pickup device connecting terminal 11 and the input terminal 12 of the mixing amplifier 2 to the base of the transistor Q1. The character signal inputted to the mixing amplifier 2 is mixed with the luminance signal inputted from the luminance signal input terminal 24, and is amplified within the mixing amplifier 2, and then the mixed and amplified signal is mixed by way of the transistor Q2 with the composite sync signal inputted from the composite sync signal input terminal 26, and is amplified, so that one portion thereof is fed via the output terminal 6 to the record/reproduce apparatus 7 to be recorded by the record/reproduce apparatus 7.

The other portion is fed back to the image-pickup device connecting terminal 5 of the character signal generating device 4 via the output terminal 3 as a superimposed signal retarded by one horizontal sync period (H). In addition, since the image-pickup device connecting terminal 5 is connected to the viewfinder connecting terminal 13, an image upon which characters have been superimposed is displayed at the viewfinder 14.

The monitoring mode is a mode for producing an image upon which characters are superimposed at the monitor image receiver 9 in the same manner as in the image-producing mode. The way of flow of signals is the same as in the image-outputting mode. However, the monitoring mode differs from the image-outputting mode in that it is possible to input characters from the keyboard 34, and image-production can be performed on the monitor image receiver 9 in the same manner as in the image-outputting mode with the monitor image receiver 9 being connected to the output terminal 6 of the mixing amplifier 2.

In the case that the system shown in FIG. 3 is used as a standard dubbing system, the respective blocks may be connected as indicated by dotted lines in FIG. 3. Namely, the video signal output terminal 18 of the record/reproduce apparatus 7 used for reproducing is connected to the output terminal 6 of the mixing amplifier 2, and also to the video signal input terminal 19 of the character signal generating device 4, while the audio signal output terminal 20 of the record/reproduce apparatus 7 is connected to the audio signal input terminal 21 of the record/reproduce apparatus 16, and the video signal output terminal of the record/reproduce apparatus 16 is connected to the monitor image receiver 9.

Furthermore, the output terminal 3 of the mixing amplifier 2 may be connected to the image-pickup device connecting terminal 5 of the character signal generating device 4, the video signal output terminal 15 of the character signal generating device 4 being connected to the image-pickup device connecting terminal 17 of the record/reproduce apparatus 16, the image-pickup device connecting terminal 11 of the character signal generating device 4 being connected to the input terminal 12 of the mixing amplifier 2, and the viewfinder connecting terminals 13 and 13' of the character signal generating device 4 being connected to the viewfinder 14.

The operation of the mixing amplifier 2 will be described first. When the record/reproduce apparatus 7 is put in reproduce mode for dubbing from the record/reproduce apparatus 7 to the record/reproduce apparatus 16, a reproduced video signal is inputted from the output terminal 6 to the mixing amplifier 2. Since the level of this reproduced video signal is greater than 3 V, the transistor Q3, whose base voltage is 2.9 V, is put in cutoff state, the reproduced video signal is fed via the resistors R11 and the output terminal 3 to the image-pickup device connecting terminal 5 of the character signal generating device 4.

When the transistor Q3 is put in cutoff state, since the level of the output of the operational amplifier 27 turns low, the transistor Q1, whose base is conected via the diode D1 to the output terminal of the operational amplifier 27, is put in cutoff state.

As a result, the character signal outputted from the image-pickup device connecting terminal 11 of the character signal generating device 4 is prevented from being inputted to the mixing amplifier 2, and therefore, a high-frequency signal (for instance, a signal corresponding to a contour line of the character) is not outputted from the output terminals 3 and 6 of the mixing amplifier 2.

Now, the operation of the character signal generating device 4 will be described. The reproduced video signal fed from the record/reproduce apparatus 7 used for reproducing to the image-pickup device connecting terminal 5 of the character signal generating device 4 is then fed to the sync signal separating circuit 28 of the character signal generating device 4. After the composite sync signal is separated from the above-mentioned reproduced video signal within the sync signal separating circuit 28, it is inputted to the vertical sync signal separating circuit 29 in which the vertical sync signal is separated from the above-mentioned composite sync signal, and this vertical sync signal is fed to the control unit 30. In addition, the composite sync signal separated within the sync signal separating circuit 28 is also fed to the control unit 30.

The control unit 30 exchanges data with respect to the memory 33 in accordance with manipulated instructions, and controls the character generator 31 and the control gates 32a, 32b and 32c. The character signal outputted from the character generator 31 is fed via the control gate 32a to the viewfinder connecting terminal 13', via the control gate 32b to the image-pickup device connecting terminal 11, and via the control gate 32c to the base of the transistor Q4.

In the case of the standard dubbing system also, the character signal generating device 4 is capable of selecting one of the following three modes.

(1) IMAGE-PRODUCING MODE
(2) IMAGE-OUTPUTTING MODE
(3) MONITORING MODE

Althuogh a supply source of composite video signal is the image-pickup device 1 in the above-described standard recording system, the supply source of the composite video signal is now replaced with the record-/reproduce apparatus 7 in the standard dubbing system.

The image-producing mode is a mode for producing an image upon which character are superimposed at the view finder 14. Namely, the composite video signal inputted from the video signal input terminal 18 of the record/reproduce apparatus 7 used for reproducing, to the mixing amplifier 2 of the image-pickup device 1, is inputted to the image-pickup device connecting terminal 5 of the character signal generating device 4 via the resistors R12 and R11 and the output terminal 3 since the transistor Q3 assumes a cutoff state as described in the above. The composite video signal inputted to the image-pickup device connecting terminal 5 of the character signal generating device 4 is divided into two flows. One of them is fed via the viewfinder connecting terminal 13 to the viewfinder 14.

The other is fed via the sync signal separating circuit 28 and the vertical sync signal separating circuit 29 to control unit 30. The control unit 30 outputs a control signal to the character generator 31, which control signal data of character signals stored in the memory 33 is transmitted to the character generator 31 in accordance with arbitrary inputted characters defined by the manipulation of the keyboard 34. In receipt of the control signal, the character generator 31 outputs a character signal which is synchronized with the sync signal of the composite video signal inputted to the the image-pickup device connecting terminal 5.

Meanwhile, the control unit 30 controls the control gates 32a, 32b and 32c.

In the case of the image-producing mode the state of the control gates are as follows:
control gate 32a ... ON
control gate 32b ... OFF
control gate 32c ... OFF Accordingly, the character signal, which is the output signal from the character generator 31, is outputted from only the viewfinder connecting terminal 13' via the control gate 32a put in conductive state, so as to be fed to the viewfinder 14, and therefore, an image and characters are displayed in a superimposed manner in the viewfinder 14.

The image-outputting mode is a mode for recording the superimposed signal obtained by superimposing the character signal upon the video signal produced in the image-producing mode, by way of the record/reproduce apparatus 7. The way of flow of signals is the same as in the image-producing mode. However, the following two points are different from the image-producing mode.

(1) Character-inputting from the keyboard 34 cannot be carried out.

(2) The control gates are in the following states: control gate 32a ... OFF control gate 32b ... ON control gate 32c ... ON Accordingly, the character signal synchronized with the sync signal of the composite video signal, which is inputted to the image-pickup device connecting terminal 5 of the character signal generating device, is fed from the character generator 31 via the control gate 32b, the image-pickup device connecting terminal 11 and the input terminal 12 of the mixing amplifier 2 to the base of the transistor Q1. However, since the transistor Q1 is in a cutoff state as described in the above, the above-mentioned character signal is fed via the control gate 32c and the transistor Q4 to the video signal output terminal 15.

Since the video signal output terminal 15 is connected to the video signal input terminal 19 to which the composite video signal is fed from the video signal output terminal 18 of the record/reproduce apparatus 7 used for reproducing, a superimposed signal obtained by superimposing the character signal upon the composite video signal is fed from the video signal output terminal 15 to be recorded by the record/reproduce apparatus 16 used for recording.

The monitoring mode is a mode for producing an image upon which characters are superimposed at the monitor image receiver 9 in the same manner as in the image-producing mode. The way of flow of signals is the same as in the image-outputting mode. However, the monitoring mode differs from the image-outputting mode in that it is possible to input characters from the keyboard 34, and image-production can be performed on the monitor image recceiver 9 in the same manner as in the image-producing mode with the monitor image receiver 9 being connected to the video signal output terminal 22 of the record/reproduce apparatus 16.

On the occasion of imaging subjects by using a video camera, when performing superimposition of characters, symbols or the like upon the image as described in the above, it is sometimes intended to superimpose characters, symbols or the like upon the same in the form of a sentence bridging over several lines in correspondence with the progress of images. To this end, it can be thought that the characters, symbols or the like to be superimposed are subjected to scroll (being moved upward within the picture area).

Figure 4A:
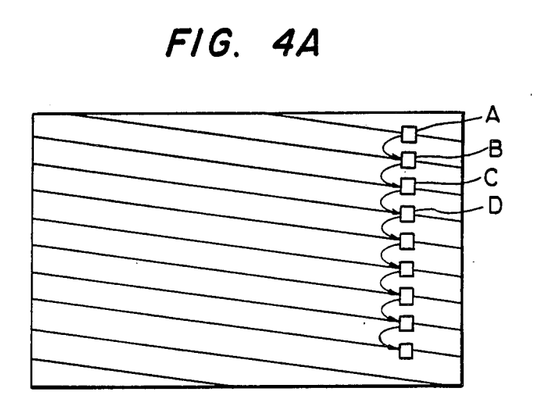
FIGS 4A and 4B are diagrams for the description of a scroll starting from odd and even fields.

When performing a scroll, if the scroll is started from an odd field, the scroll is carried out as A→B→C→D as seen in FIG. 4A.

Figure 4B:
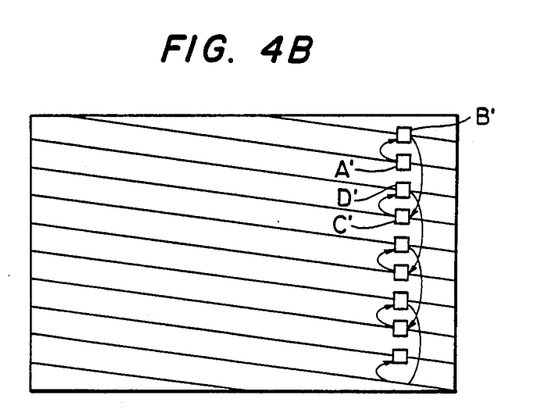

However, if a scroll is started.. from an even field, scroll is carried out as A'→B'→C'→D'→ as seen in FIG. 4B. As a result, so called V shaking occurs with the displayed characters shaking vertically.

Accordingly, when it is intended to perform a scroll, it can be thought that the scroll is started from an odd field with the field being recognized as an odd field or an even even field, and an origin in the picture area is advanced by one horizontal sync period (which may be referred to as H hereinafter) each time an odd field is detected so as to advance the scroll by one line for each frame thereby performing scroll smoothly.

At this time, a window may be provided electrically within the picture area so that characters are displayed only at this window portion thereby performing a scroll in a natural manner.

In order to scroll with characters being moved each time of H, it is necessary to form a special circuit in addition to circuits used generally. When forming such a special circuit on an integrated circuit, the structure thereof would be very complicated, and therefore, scrolling has normally been performed by moving the displaying position of characters by a distance corresponding to a single pixel on the picture area. However, this suffers from problems that it requires a large capacity of a memory and the scroll speed is low. Therefore, it can be thought that scroll of characters is performed each time of H as will be described hereinafter.

Figure 5:
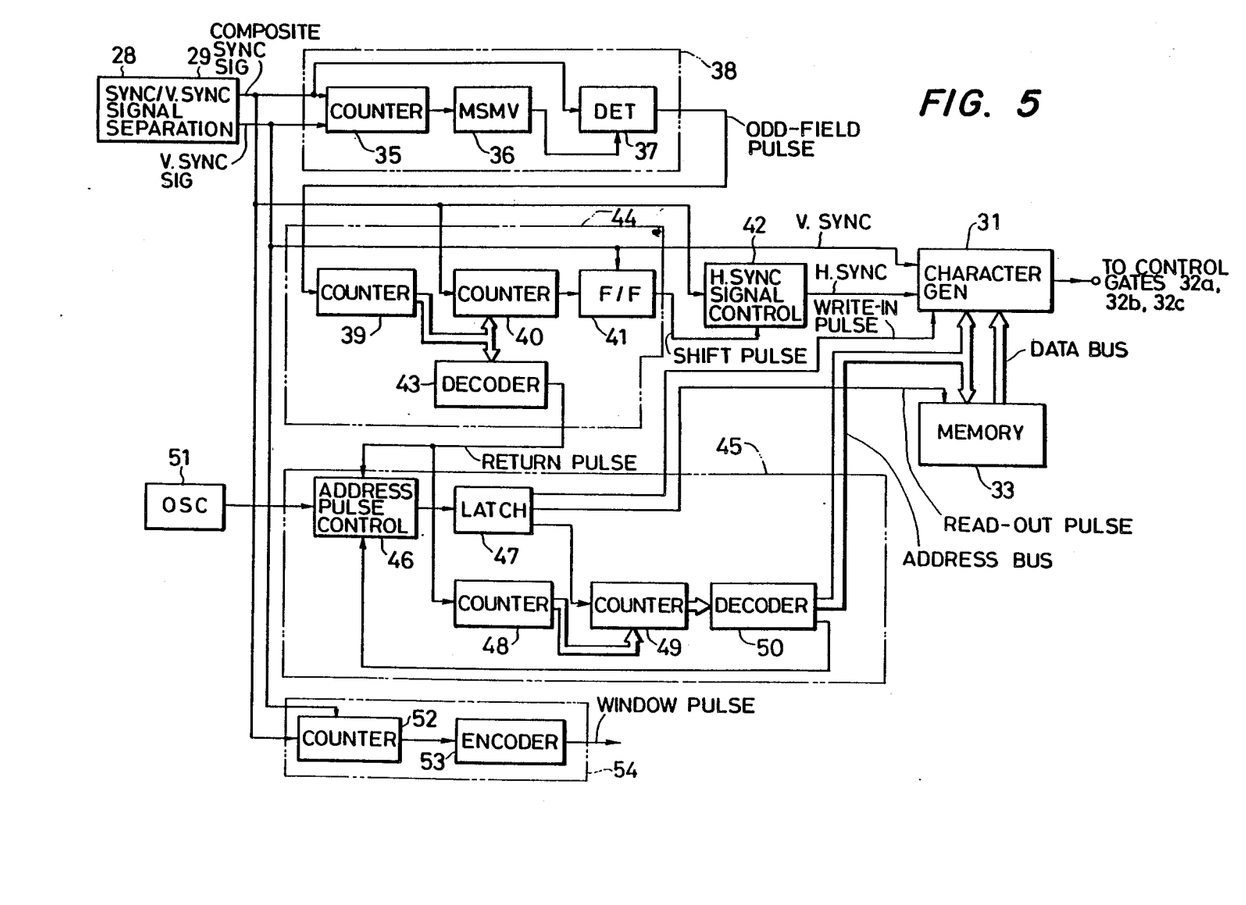
FIGS. 5 and 6 are block diagrams of the control unit used in the bock diagram of FIG. 3.
Figure 6:
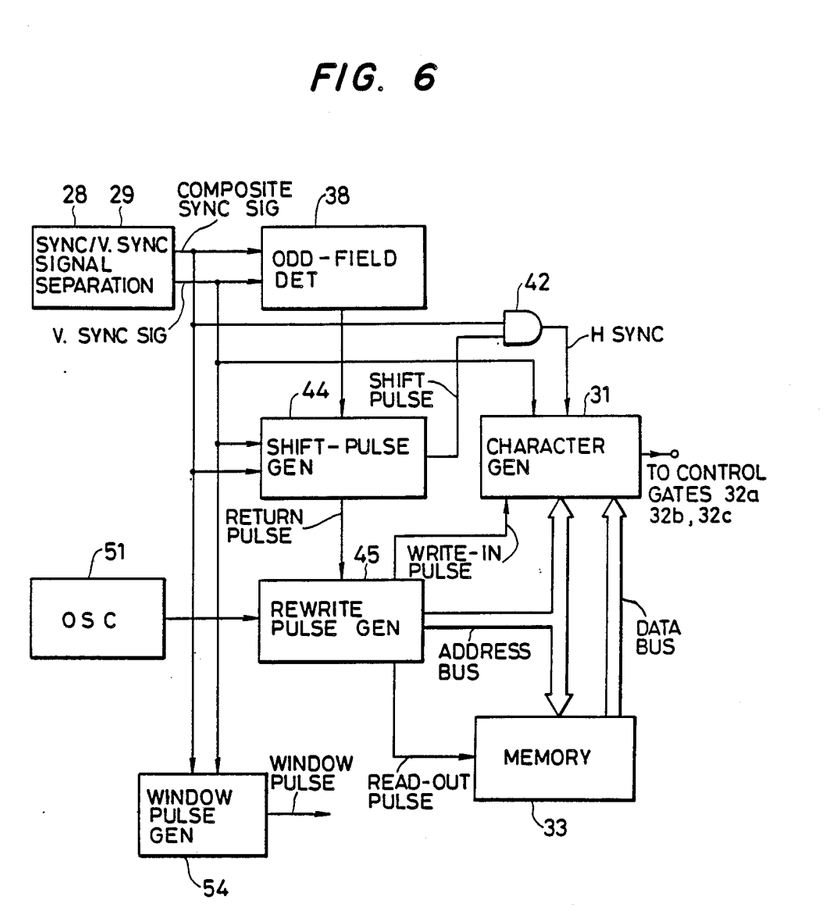

The above-mentioned detection of an odd field will be described with reference to FIGS, 5 and 6.

In FIG. 5, the reference 35 is a counter; 36, a monostable multivibrator; and 37 a detection circuit which may be a NAND gate. The above-mentioned counter 35, the monostable multivibrator 36 and the detecting circuit 37 are elements constituting an odd-field detecting portion 38 shown in FIG. 6.

The odd-field detecting portion outputs an odd-field pulse when detecting an odd field as will be described in detail hereinbelow. Since the number of equalizing pulses within the composite sync signal inputted from the sync signal separating circuit 28 and the vertical sync signal separating circuit 29 is six for both an odd field and an even field, where a pulse following the sixth equalizing pulse in an odd field has a width of 0.5H, and has a width of 1H in an even field, the counter 35 detects the sixth equalizing pulse with the equalizing pulses being counted so as to trigger the monostable multivibrator 36 arranged to output a negative logic pulse having a width which is greater than 0.5H and smaller than 1H, and which may be ¾ H. In the case of a video signal, such as a signal from a video tape-recording system, because of negative modulation in which a bright portion is of low level and a dark portion is of high level, the detecting circuit 37 provides a NANDed result of the above-mentioned composite sync signal and the output from the monostable multivibrator 36, and therefore outputs the odd-field pulse when detecting an odd field.

Now, it can be thought that the horizontal sync fed to the character generator 31 be controlled when the above-mentioned odd-field pulse is outputted in order to scroll characters so as to move displayed characters upwardly within the picture area.

In FIG. 5, the reference 39 is a counter; 40, another counter; 41, a flip-flop; 42, a horizontal sync signal controller which may be actualized by an AND gate; and 43, a decoder. The above-mentioned counters 39 and 40, the flip-flop 41, and the decoder 43 are elements constituting a shift-pulse generator 44 shown in FIGS. 5 and 6.

The above-mentioned shift-pulse generator 44 controls the number of horizontal sync pulses inputted to the character generator 31 in response to the odd-field pulses fed from the odd-field detecting portion 38, and also outputs a return pulse which will be used for making a new line.

More specifically, when the odd-field pulse is inputted to the counter 39, in which a predetermined number such as 14 is preset, the counter 39 counts down the odd-field pulses inputted. The count of the counter 39 is fed to the other counter 40 so that the other counter 40 outputs an output pulse when the number of H. sync pulses reaches the count from the counter 39. In other words, the other counter 40 outputs a pulse when the number of the horizontal sync pulses within the composite sync signal equals the number of odd-field pulses, which is represented by an output from the counter 39. When the output pulse of the counter 40 is inputted to the flip-flop 41, the output is maintained until a subsequent vertical sync pulse is inputted. In respose to the output from the flip-flop 41, the horizontal sync signal controller 42 supplies the character generator 31 with the horizontal sync pulses whose number is reduced by the number of odd-field pulses counted by the counter 39. As this operation is repeated so that the number of H sync pulses fed to the character generator 31 changes one by one, the characters displayed on the picture area are scrolled upwardly smoothly.

As the above operation is repeated, and assuming that the position of the characters displayed on the picture area is moved upwardly by one character line when the counter 39 counts fourteen odd-field pulses, then the decoder 43, to which the output of the counter 39 is fed, outputs the return pulse for making a new-line.

Figure 7A:
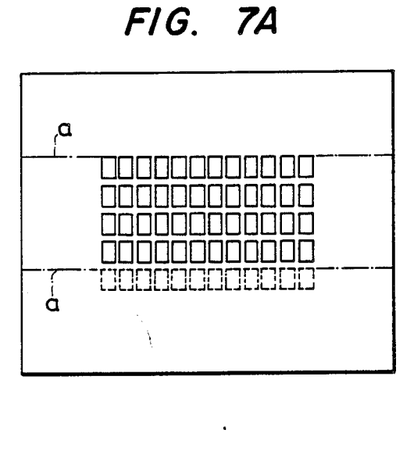
FIG. 7 is a diagram for the description of a scroll operation.
Figure 7B:
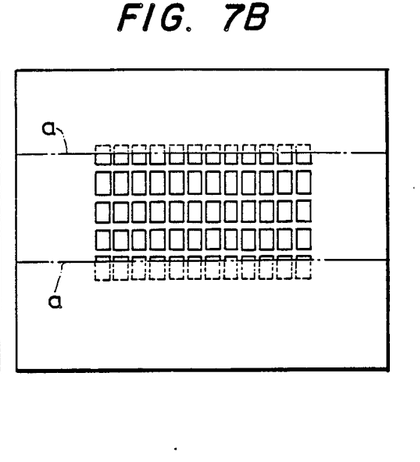
Figure 7C:
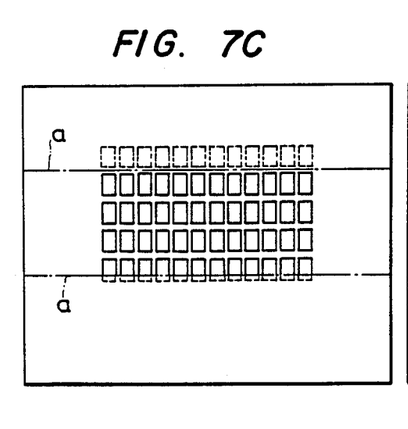
Figure 7D:
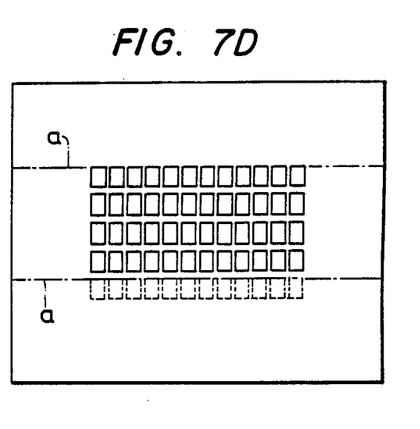

FIG. 7A is a diagram showing a state before scroll is started. It is assumed that character data or signal corresponding to a plurality of lines, such as 45 lines, has been stored in the memory 33 in accordance with instructions fed from the keyboard 34 in the above-described image-producing mode. Among the forty-five lines, the first four lines and the last four lines are blank lines in which no characters can be displayed. With the provision of the electronic window "a" within the picture area, four lines can be displayed simultaneously while character data of five lines is outputted from the character generator 31. FIG. 7B is a diagram showing a state effecting scroll. FIG. 7C is a diagram showing a state where scroll has been completed. FIG. 7D is a diagram showing a state when a new line has been made.

The shift pulse generator 44 controls the horizontal sync pulses fed to the character generator 31 in response to the odd-field pulses inputted to the shift pulse generator 44, and characters for as many as five lines are written in as data with an initial setting as shown in FIG. 7A, and characters, four lines of which are displayed by way of the window "a" formed by the window pulse which will be described hereinlater, are scrolled upwardly. A state in the middle of scroll is shown in FIG. 7B, where one half the first line is concealed by the window "a" formed by the window pulse and one half the fifth line is displayed. As scroll is further effected, the state of FIG. 7C is made in which the first line is concealed by the window "a" formed by the window pulse, and the second to fifth lines are being displayed. If scroll is continued under this condition, since the sixth line has not been written as data, the last line would be displayed as a blank line. To prevent this, data rewriting is performed. Namely, the second to sixth lines are newly written with the first line being erased. This state is shown in FIG. 7D.

Hereinbelow will be described a rewrite pulse generator 45 which rewrites this data.

In FIG. 5, the reference 46 is an address pulse controller which may be actualized by an IC known as MN1554JVA of Matsushita Electric Ind. Co. Ltd.; 47, a latch; 48, a counter; 49, a counter; and 50, a decoder. The above-mentioned address pulse controller 46, the latch, the counters 48 and 49, and the decoder 50 are elements constituting the rewrite pulse generator 45 shown in FIGS. 5 and 6.

The above-mentioned rewrite pulse generator 45 is provided for making a new line, i.e. rewriting data transmitted to the character generator 31, and for detecting the last character line using the return pulses fed from the shift pulse generator 44.

More specifically, when the return pulse is inputted from the shift pulse generator 44 to the address pulse controller 46, the address pulse controller 46 generates a pulse used for rewriting the displayed characters, and sends the same to the latch 47 in the case that the displayed character line is not the last line. The address pulse controller 46 uses the output from the oscillator 51 as a clock.

The latch 47 sends a write-in pulse to the character generator 31 in response to the output from the address pulse controller 46, and also sends a read-out pulse to the memory 33. The counter 48, to which the return pulse is inputted, counts the number of return pulses so as to determine the top address of data to be read out from the memory 33. The counter 49 is reset since a reset pulse is inputted thereto from the latch 47 when the return pulse is inputted to the rewrite pulse generator 45, and counts the addresses corresponding to five lines from the top address determined by the counter 48, and the count is transmitted to the decoder 50.

The decoder 50 controls, through an address bus, the addresses of data to be transmitted from the memory 33 to the character generator 31 in receipt of the output from the counter 49. In detail, assuming twelve characters are inclued in each of the five lines, addresses 0 through 60 are designated at first for outputting chracter data of five lines. As a result, data of 60 bytes is read out in response to the read-out pulse from the latch 47 and is transmitted to the character generator 31, and is written therein in response to the write-in pulse from the latch 47. Then in response to the -return pulse, addresses 12 througt 72 are designated so as to rewrite data prestored in the character generator 31. As a result, data of the first line has been erased, and data of the sixth line has been added while data of the second through fifth lines are now used as data of new first through fourth lines. With this control, data is transmitted from the memory 33 to the character generator 31 via a data bus. When data of sixty bytes has been transmitted from the memory 33 to the character generator 31, the decoder 50 produces another output signal which is fed to the address pulse controller 46 so that the address pulse controller 46 is disabled for preventing further rewriting until a subsequent return pulse is received.

In FIG. 5, the reference 52 is a counter; and 53, an encoder, and these elements constitute the window pulse generator 54 shown in FIGS. 5 and 6. The above-mentioned window pulse generator 54 is provided for outputting a pulse so as to provide a window on the picture area as shown in FIGS. 7A to 7D.

In detail, the counter 52 is reset by the vertical sync pulse fed from the sync signal separating circuit 28 and the vertical sync signal separating ciruit 29 so as to count the horizontal sync pulses within the composite sync signal. The counter 52 is, for instance, of binary code, and outputs the window pulse having a width of a constant horizontal sync period with the output from the counter 52 being decoded by the decoder 53.

Figures 8, 8A:
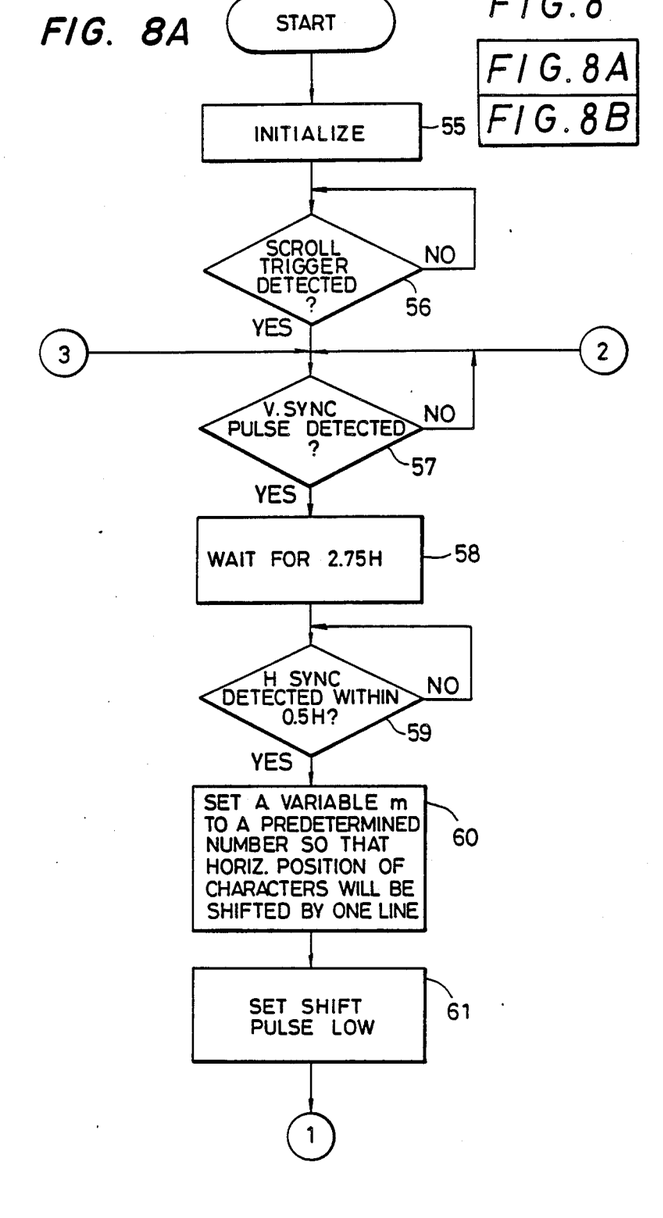
Figure 8B:
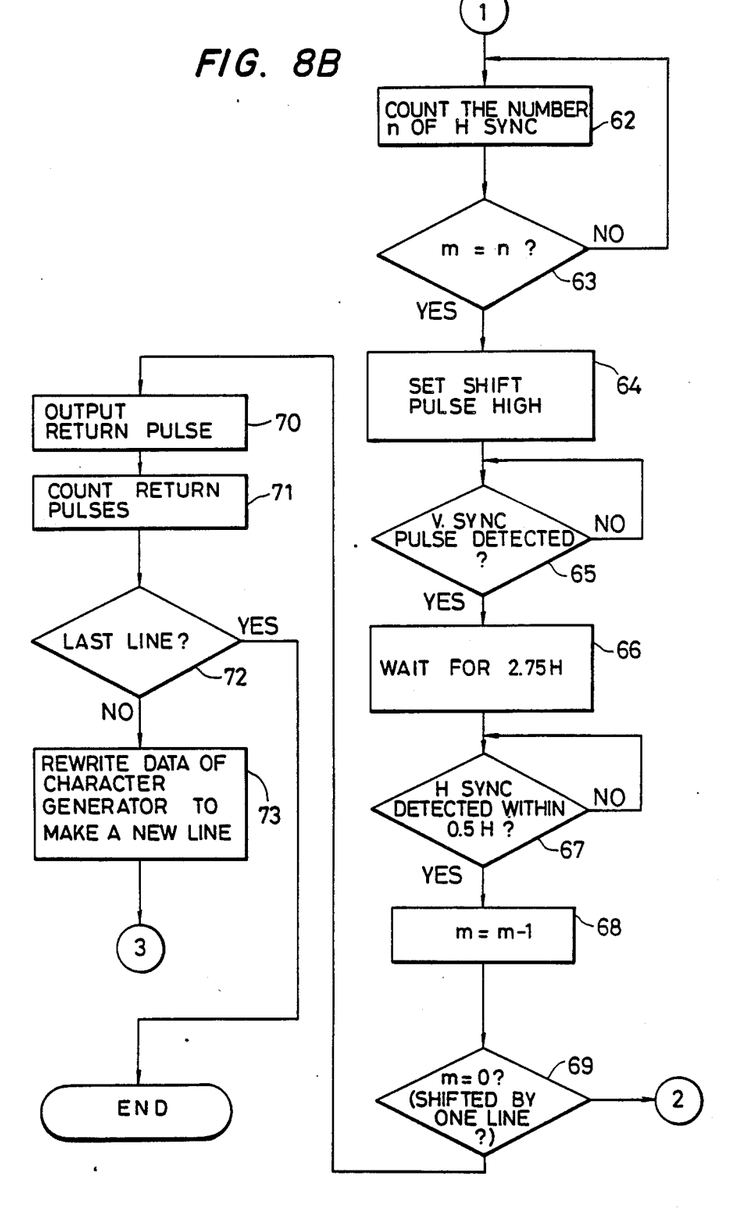

When the above-mentioned odd-field detector 38, the shift pulse generator 44 and the rewrite pulse generator 45 substantially correspond to the control unit 30 of FIG. 3 implemented by a microcomputer, it operates in accordance with a flowchart shown in FIG. 8 comprising FIGS. 8A and 8B. In detail, a microcomputer having a central processing unit (CPU), a read-only memory (ROM), a random-access memory (RAM), and an input-output device (I/O) operates in accordance with instructions prestored in the ROM. More specifically, when the CPU starts operating, in a first step 55 initialization is effected in which data indicative of displaying position and character data corresponding to a single picture area, i.e. five line character data in the above-embodiment, is read out from the memory 33 to be transmitted to the character generator 31. Then it is determined in a step 56 whether a scroll trigger has been inputted from the keyboard 34. This scroll trigger may be generated when a button or a key is manipulated when the user intends to peform a scroll of displayed characters. The following description is made under a condition that the scroll trigger has been detected in the step 56.

Steps 57 through 59 are provided for detecting an odd field. In the step 57, a vertical sync pulse is detected, and as soon as a vertical sync pulse is detected, a predetermined period of time of 2.75H is set in a timer so that waiting is performed for this period of time in the step 58. This step is provided for disregarding the equalizing pulses following the v sync pulse. Then in the step 59, a following horizontal sync pulse is detected within a period of 0.5H so as to distinguish an odd field from an even field. When an odd field is detected, a variable "m" is set to a predetermined number such as fourteen in a step 60 so that horizontal position of displayed characters will be shifted by one character line. After this, the shift pulse fed to the AND gate 42 of FIG. 6 is set to LOW level in a step 61. In a following step 62, the number "n" of horizontal sync pulses is counted, and the count "n" is then compared with the variable "m" in the step 63. When these values "m" and "n" equal each other, a step 64 takes place to set the shift pulse to HIGH level. As a result, horizontal sync pulses, whose number is reduced by the number of detected odd-fields, are fed to the character generator 31 via the AND gate 42.

The following steps 65 through 67 are identical with the steps 57 through 59, and a subsequent odd field is detected. In a following step 68, the variable "m" is decreased by one so as to set the shift pulse to HIGH level in the step 64 in a subsequent operational cycle at a timing 1H earlier than before. In detail, the time width of the shift pulse is reduced by 1H every field so that it changes as 13H, 12H, 11H . . . 2 H, 1H, 0. In the illustrated embodiment of FIGS. 7A to 7D the superimposed character lines are upwardly moved in the scrolling operation.

In a following step 69, it is determined whether the variable "m" has reached zero or not. Since the state of m=0 indicates that displayed character lines have been shifted upwardly by a distance corresponding to one character line, then the return pulse is outputted in a step 70. The number of the return pulses is counted in a step 71 to determine whether the last line of characters to be displayed, i.e. the fdurth-fifth line, is now displayed within the electronic window "a". If the last line is not displayed within the window "a", this state is detected in a step 72 so as to make a new line, in a step 73, by rewriting data of five lines as described in the above, and operations which are the same as the above are repeated until the last line is detected.

Because the present invention has the above-described structure, it provides an advantage that the displaying position of characters can be changed smoothly and naturally with easy operation.

The above-described embodiments are just examples of the present invention, and therefore, it will be apparent for those skilled in the art that many modifications and variations may be made without departing from the spirit of the present invention.

What is claimed is:

1. A circuit arrangement for moving characters superimposed on an image represented by a video signal to be fed to an interlacing CRT, for use with a character signal mixing circuit which produces a composite video signal having horizontal and vertical sync pulses, said circuit arrangement comprising:
   (a) an odd-field detecting means responsive to said composite video signal for producing output pulses by detecting odd fields;

(b) means responsive to said odd-field detecting means, said vertical sync pulses and said horizontal sync pulses for providing said horizontal sync pulses in such a manner that the number of said horizontal sync pulses is reduced by the number of detected odd fields, and for producing a return pulse, said horizontal sync pulses being provided in response to said vertical sync pulse when the number of said horizontal sync pulses equals a number determined by the number of said detected odd-fields, and said return pulse being produced when a predetermined number of said odd fields are detected;

(c) a memory in which character data is stored;

(d) a character generator for receiving said character data from said memory so as to supply said mixing circuit with character signals in response to said horizontal sync pulses fed from said means responsive to said odd-field detecting means and to said vertical sync pulses;

(e) a rewrite pulse generator responsive to said return pulse for rewriting character data transmitted to said character generator; and (f) a window pulse generator responsive to said horizontal sync pulses and vertical sync pulses for determining displaying width on a picture area of a display unit, said character signal mixing circuit being arranged to mix said character signals from said character generator and said horizontal and vertical sync pulses with said video signal and to supply said character generator with a resultant mixed signal.

2. A circuit arrangement as claimed in claim 1, wherein said odd-field detecting means comprises:

(a) a counter responsive to said composite video signal for counting a number of equalizing pulses of said composite video signal and producing an output signal when the number of said equalizing pulses reaches six;

(b) means responsive to said output signal from said counter for producing an output pulse having a width greater than 0.5H and smaller than 1H wherein H represents one horizontal sync period; and (c) a gate circuit responsive to said composite video signal and to said output pulse from said means responsive to said output signal from said counter, said gate circuit operable for producing an output signal of said odd-field detecting means.

3. A circuit arrangement as claimed in claim 1, wherein said means responsive to said odd-field detecting means comprises:

(a) a first counter responsive to output pulses from said odd-field detecting means for producing an output signal when the number of said output pulses reaches a predetermined value;

(b) a second counter responsive to said horizontal sync pulses for counting the number of the same;

(c) a flip-flop arranged to be set by an output signal from said second counter and reset by said vertical sync pulse;

(d) a gate circuit responsive to an output signal from said flip-flop for transmitting said horizontal sync pulses only when said flip-flop is in set state; and (e) a decoder responsive to said output signal from said first counter for producing said return pulse when said first counter counts a predetermined number of said pulses from said off-field detecting means.

4. A circuit arrangement as claimed in claim 1, wherein said rewrite pulse generator comprises:

(a) means responsive to said return pulse for producing a write-in pulse, a read-out pulse, and a reset pulse;

(b) a first counter responsive to said return pulse for counting the number of the same so as to determine a top address of said memory;

(c) a second counter responsive to an output signal from said first counter for determining addresses of said memory corresponding to a predetermined number of character lines such that said addresses start from said top address, said second counter also being responsive to said reset pulse from said means responsive to said return pulse so as to change the count thereof by a predetermined number; and (d) a decoder responsive to an output signal from said second counter for producing a first signal for designating addresses of said memory and said character generator, said decoder producing a second output signal indicating that a last character line is being displayed, which second output signa is fed to said means responsive to said return pulse to cause the same to operate only when said last character line is not displayed.

5. A circuit arrangement for moving characters superimposed on an image represented by a video signal to be fed to an interlacing CRT, for use with a character signal mixing circuit for producing a composite video signal including horizontal and vertical sync pulses, said circuit arrangement comprising:

(a) a memory in which data of character data is stored;

(b) a character generator for receiving said character data from said memory so as to supply said mixing circuit with character signals in response to said horizontal sync pulses;

(c) computing means responsive to said composite video signal;

for detecting odd fields;

for providing a number of said horizontal sync pulses in such a manner that the number of said horizontal sync pulses has been reduced by the number of detected odd-fields, to said character generator when the number of said horizontal synch pulses equals the number of said detected odd-fields;

for producing a return pulse when a predetermined number of said odd-fields are detected; and for rewriting character data transmitted from said memory to said generator, in response to said return pulse; and (d) a window pulse generator responsive to said horizontal sync pulses and vertical sync pulses for determining displaying width on a picture area of a display unit, said character signal mixing circuit being arranged to mix said character signals form said character generator and said horizontal and vertical sync pulses with said video signal and to supply said character generator with a resultant mixed signal.

6. A circuit arrangement for moving characters superimposed on an image represented by a video signal to be fed to an interlacing CRT, for use with a character signal mixing circuit for producing a composite video signal including horizontal and vertical sync pulses, said circuit arrangement comprising:

(a) a memory in which data of character data is stored;

(b) a character generator for receiving said character data from said memory so as to supply said mixing circuit with character signals in response to said horizontal sync pulses;

(c) computing means responsive to said composite video signal;

for detecting odd fields;

for providing a number of said horizontal sync pulses in such a manner that the number of said horizontal sync pulses has been reduced by a number determined by the number of detected odd-fields, to said character generator in response to said vertical sync pulse when the number of said horizontal sync pulses equals said number determined by the number of said detected odd-fields;

for producing a return pulse when a predetermined number of said odd-fields are detected; and for rewriting character data transmitted from said memory to said character generator, in response to said return pulse; and (d) a window pulse generator responsive to said horizontal sync pulses and vertical sync pulses for determining displaying width on a picture area of a display unit, said character signal mixing circuit being arranged to mix said character signals from said character generator and said horizontal and vertical sync pulses with said video signal and to, supply said character generator with a resultant mixed signal.

7. A circuit arrangement for moving characters superimposed on an image represented by a video signal for use with a character signal mixing circuit which produces a composite video signal having horizontal and vertical sync pulses, said circuit arrangement comprising:

(a) an image field detecting means responsive to said composite video signal for producing output pulses by detecting image fields;

(b) means responsive to said image field detecting means, said vertical sync pulses and said horizontal sync pulses for providing a number of said horizontal sync pulses including means for reducing the number of said horizontal sync pulses by a number determined by the number of detected image fields, and for producing a return pulse, said horizontal sync pulses being provided in response to said vertical sync pulse when the number of said horizontal sync pulses equals said number determined by the number of said detected image fields, and said return pulse being produced when a predetermined number of said image fields are detected;

(c) a memory in which character data is stored;

(d) a character generator for receiving said character data from said memory so as to supply said character signal mixing circuit with character signals in response to said horizontal sync pulses fed from said means responsive to said image field detecting means and to said vertical sync pulses;

(e) a rewrite pulse generator responsive to said return pulse for rewriting character data transmitted to said character generator; and (f) a window pulse generator responsive to said horizontal sync pulses and vertical sync pulses for determining displaying width on a picture are of a display unit, said character signal mixing circuit including means for mixing said character signals from said character generator and said horizontal and vertical sync pulses with said video signal and to supply said character generator with a resultant mixed signal.

8. A circuit arrangement method as claimed in claim, 7 wherein said step of detecting whether a coming field is either an odd field or an even field, comprises the steps of:

(a) detecting said vertical sync pulse:

(b) waiting for a period of time of 2.75H wherein H is the period of the horizontal sync period;

(c) detecting a subsequent horizontal sync pulse within 0.5H.

9. A circuit arrangement as claimed in claim 7, wherein said step of transmitting comprises the steps of:

(a) counting the number of said horizontal sync pulses;

(b) comparing the number of said horizontal sync pulse with a variable initially set to a further predetermined number;

(c) starting transmission of said horizontal sync pulses when said number of horizontal sync pulses equals said variable each time an odd-field is detected;

(d) decreasing said variable by one each time an odd field is detected; and (e) terminating transmission of said horizontal sync pulses when a subsequent odd-field is detected.

10. A circuit arrangement as claimed in claimi 7, wherein said step of transmitting comprises the steps of:

(a) counting the number of said odd-field pulses;

(b) counting the number of said horizontal sync pulses;

(c) comparing said numbers with each other; and (d) transmitting said horizontal sync pulses to said character generator for a period of time determined by the number of said odd-field pulses when said numbers are equal to each other.

11. A circuit arrangement as claimed in claim 9, wherein said step of detecting whether displayed characters have been shifted, comprises the step of detecting whether said variable has reached zero or not.

12. A circuit arrangement as claimed in claim 6, wherein said computing means is arranged to execute the steps of:

(a) detecting whether a coming field is either an odd field or an even field and producing an odd-field pulse each time an odd field is detected;

(b) transmitting said horizontal sync pulses to said character generator for a period of time;

(c) reducing said period of time by 1H every odd field, wherein H is a period of said horizontal sync pulse;

(d) detecting whether displayed characters have been shifted by a distance corresponding to one character line and producing a return pulse when shifting by one character line is detected;

(e) counting the number of said return pulses;

(f) detecting whether the number of said return pulses has reached a predetermined number corresponding to a maximum number of character lines to be displayed; and (g) controlling said memory and said character generator for rewriting said character data within said character generator such that data of a character line is erased and data of a new line is added, when said number of said return pulses has not yet reached said predetermined number.

* * * * *